United States Patent [19]
Dischert et al.

[11] 4,449,143
[45] May 15, 1984

[54] TRANSCODEABLE VERTICALLY SCANNED HIGH-DEFINITION TELEVISION SYSTEM

[75] Inventors: Robert A. Dischert, Burlington; Kerns H. Powers, Princeton, both of N.J.

[73] Assignee: RCA Corporation, New York, N.Y.

[21] Appl. No.: 314,847

[22] Filed: Oct. 26, 1981

[51] Int. Cl.³ .............................................. H04N 9/42
[52] U.S. Cl. ...................................... 358/11; 358/140
[58] Field of Search ................................. 358/140, 11

[56] References Cited
U.S. PATENT DOCUMENTS
4,125,862 11/1978 Catano ................................ 358/140

FOREIGN PATENT DOCUMENTS
2084833 4/1981 United Kingdom .
2097219 3/1982 United Kingdom .

Primary Examiner—Richard Murray
Attorney, Agent, or Firm—E. M. Whitacre; W. H. Meise; J. E. Roehling

[57] ABSTRACT

A high-definition television system for electronic cinematography includes vertical scanning for ease of line-rate transcoding or adaptation to standard-definition television systems. The number of vertical line-scans is selected for transcoding to a standard-definition system by deleting alternate vertical line-scan samples.

15 Claims, 12 Drawing Figures

TRANSCODEABLE VERTICALLY SCANNED HIGH-DEFINITION TELEVISION SYSTEM

BACKGROUND OF THE INVENTION

This invention relates to a high-definition televison system in which the scanning rates and directions are selected for ease of transcodeability with low distortion to the most common scanning standards for standard-definition television.

The principal world standard scanning rates are 525 lines-per-frame, 60 frames-per-second as used in the Americas and in Japan and 625 lines-per-frame, 50 frames-per-second as used for PAL and SECAM systems in Europe.

U.S. Pat. application Ser. No. 230,384 filed Feb. 2, 1981 in the name of K. Powers describes a proposed component standard for digital television systems which is readily transcodeable to the two major composite systems (NTSC and PAL) by virtue of selecting the common number of pixels in the active portion of each line to be equal to 704±16N, which makes it possible to perform pixel sample-rate interpolation by the use of multipliers consisting exclusively of shifts-and-adds. The digital standard thus proposed provides ease of transcoding between pixel sampling rates of the digital component standard and the preferred sampling rate of the major television systems.

In the production of motion pictures for both theatre and television use, substantial flexibility and cost savings in the editing (post-production) process can result from the use of television-like cameras for generating video signals representative of the image to be viewed, and by use of video tape rather than photographic film for interim storage of each day's production. This process, known as electronic cinematography, is a fast-growing art and can be expected to largely supplant the use of photographic film, at least in the editing phase of production in which different portions of the production are combined and deleted to form the ultimate work of art. Film-to-tape conversions are already widely used in post-production work because of the ease of editing the work in the form of video tape rather than as photographic film.

Present standard-definition television (SDTV) equipments which are based upon the aforementioned 525- and 625-line scanning standards are inadequate to reproduce the full vertical and horizontal resolution limits of 35-and 70-millimeter film. Consequently, a high-definition television (HDTV) system is desirable which has a resolution commensurate with the resolution of the photographic film onto which the images may be impressed.

The aspect ratio of cinematographic (movie) film is greater than the aspect ratio of the present-day standard television systems. Present television systems have an aspect ratio of 1.33 (3 units high, 4 units wide), while aspect ratios of 1.67 and 1.85 are common in cinema use, and ratios larger than 2.0:1 exist. Thus, a high-definition television system to be used for electronic cinematography must have an aspect ratio equal to that of the film to which it is to be transcoded.

In order to be compatible with photographic film, the HDTV should have a resolution in excess of one thousand lines. The number of scanned elements, or to be more exact, the number of scanning lines within the active portion of the picture should be selected to provide lowest-cost transcoding between the HDTV standard and the nominal 485 and 575 active lines of the 525- and 625-line SDTV standards.

When transcoding from one set of lines-per-frame to a second set, aliasing can occur which results from sampling vertically at a rate lower than one-half the resolution bandwidth. This may be avoided by the use of an anti-alias optical prefilter, or by an electronic vertical aperture filter applied to the signal after scanning at a sufficiently high rate. In the latter case, prefiltering by an amount suitable for the lowest expected number of lines per frame, will degrade those transcodings which are to a system having a number of lines greater than the lowest. It is not a well-publicized fact but the vertical resolutions actually achieved in 525- and 625-line systems are approximately equal. Television cameras developed for both markets use the same optics, have the same size and lag characteristic of the image pickup tubes, which are the resolution determining factors. The advantage in subjective quality achieved in 625-line systems over 525-lines is not in increased vertical resolution but rather lies in the lower visibility of the scanning lines and interlace artifacts and in greater headroom with respect to the vertical Nyquist rate and its concomitant lower vertical aliasing in regions of high vertical detail. This subjective quality advantage is counterbalanced by a higher susceptibility to flicker perception from high brightness displays of the 625-line 50 field/second television pictures.

Beats can occur in the event of line-rate transcodings. Conceptually, these result from a slight physical skew of the incoming horizontal lines to be transcoded relative to the outgoing new interpolated lines. This may result for example, from improper synchronization of line counters which allows a line-to-line slippage of the interpolation. In the case of conversion from the HDTV to cinematographic film by laser writing, beats can occur when reading the film with a telecine apparatus. It is desirable to perform such conversions in a manner which avoids such beats.

In a high definition television (HDTV) system, the data rate is much higher than the data rate of the standard-rate-signals to which transcoding is done. In order to conserve memory, it is advantageous to perform the high-definition-to-standard definition transcoding in such a manner that such memory as may be required to perform the transcoding is loaded at the standard-definition rate and not at the high-definition rate.

SUMMARY OF THE INVENTION

A mastering television video system is readily transcoded to signals having different numbers of lines-per-frame. The system comprises an imager or transducer for converting an image into a video signal by successive vertical scans of the image. The transcoding is accomplished by filtering and sampling the vertical scans at the line rate of the signal transcoded to, whereby initial line-rate interpolation is avoided. The samples are stored at the low-definition rate for subsequent read-out or frame-rate conversion of the transcoded signal.

DESCRIPTION OF THE INVENTION

Figure 1:
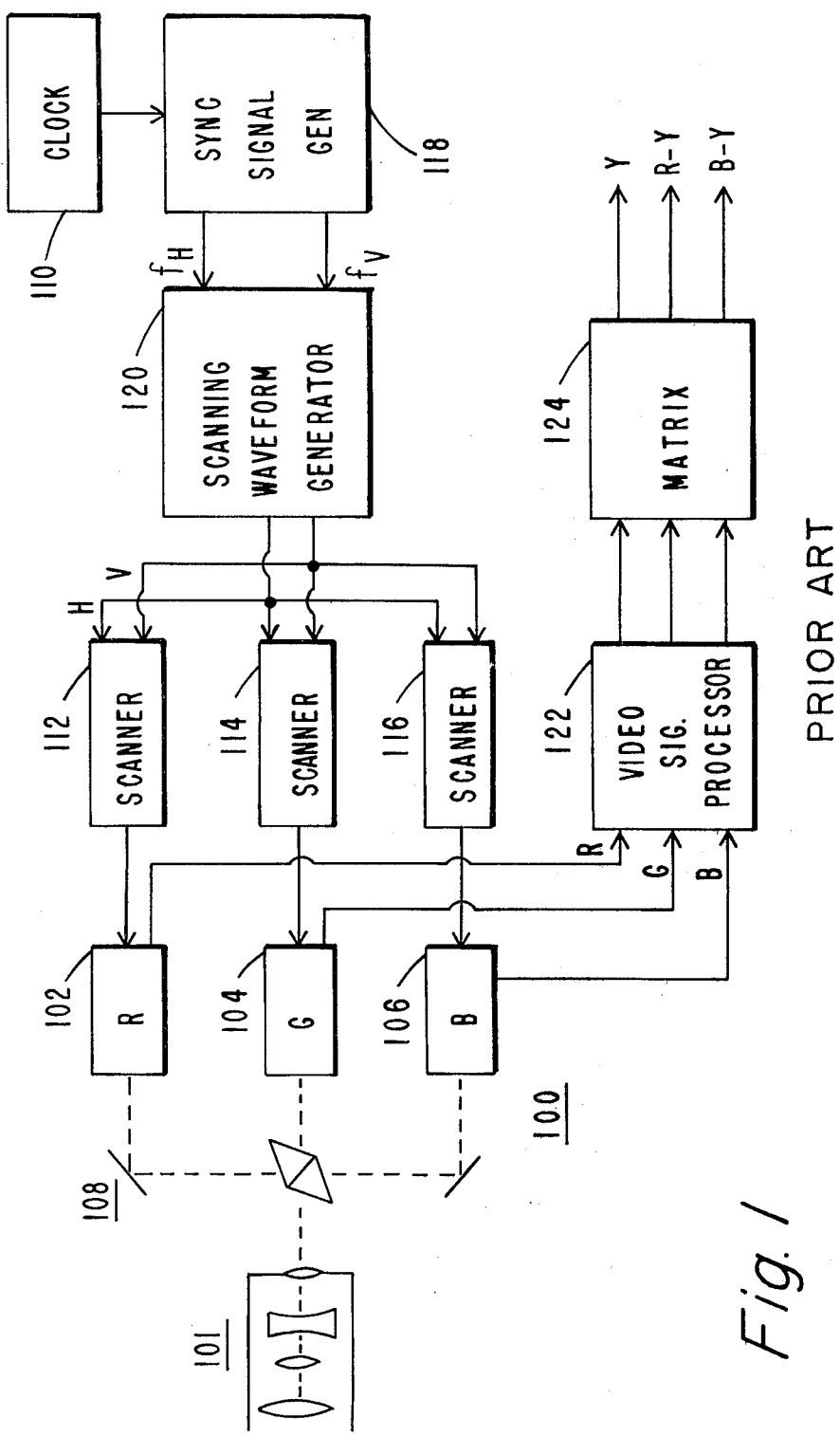
FIG. 1 is a block diagram of a high-definition television camera.

FIG. 1 illustrates in block diagram form a color televison camera 100 for producing high-definition television signals (HDTV) by vertical scanning. The block diagram itself is unexceptional and is therefore labelled prior art. In FIG. 1, an optical system designated generally as 101 focuses a light onto the active portions of image converters 102–106 by way of a color-splitting prism illustrated as 108. Imagers 102–106 may be camera tubes such as vidicons or they may be solid-state image sensors such as are well known in the art. A clock signal generator 110 drives a synchronizing signal generator 112 which produces vertical/frequency sync signals $F_V$ and horizontal-frequency sync signals $F_H$ as well as other signals such as blanking and burst gate signals (not shown). The vertical and horizontal synchronizing signals are applied from sync signal generator 112 to a scanning waveform generator 114 which produces pulse and or ramp signals appropriate to the type of imager being used. The vertical and horizontal scanning or deflection waveforms are applied to scanners 112–116 associated with imagers 102–106. When the imagers are camera tubes, the scanners may include deflection windings, focus coils and the like. Color-representative video signals are derived from each of the imagers 102–106 and are applied to appropriate video signal processing such as preamplifiers, gamma correctors and the like illustrated as a block 122. The processed R, G and B signals are applied to a matrix illustrated as a block 124 for producing the high-definition luminance (Y) and color-difference signals, illustrated in this example as R-Y, B-Y. These signals may be coupled by a transmission path to a utilization apparatus (not shown in FIG. 1) which as will be described may be an apparatus such as that of FIG. 4. The transmission path may include a tape recorder whereby the signals are transcoded to tape for storage and eventual playback.

In accordance with the invention, the high-definition camera has the scanners arranged in conjunction with the synchronizing signals and imagers so as to produce a relatively rapid vertical line-scan of the image together with a relatively low-speed horizontal scan. Of course, the term vertical line-scan as opposed to a horizontal line-scan of itself describes a meaningless difference, as a conventional horizontal line-scan camera could easily be turned on its side to provide a "vertical" line-scan. In the context of this invention, however, vertical line-scanning has the meaning of high-speed scanning orthogonal to the direction of high-speed scanning in the system transcoded to. Such standard systems as used in Japan, the Americas and in Europe have the high-speed scanning in the horizontal direction.

Figure 2A:
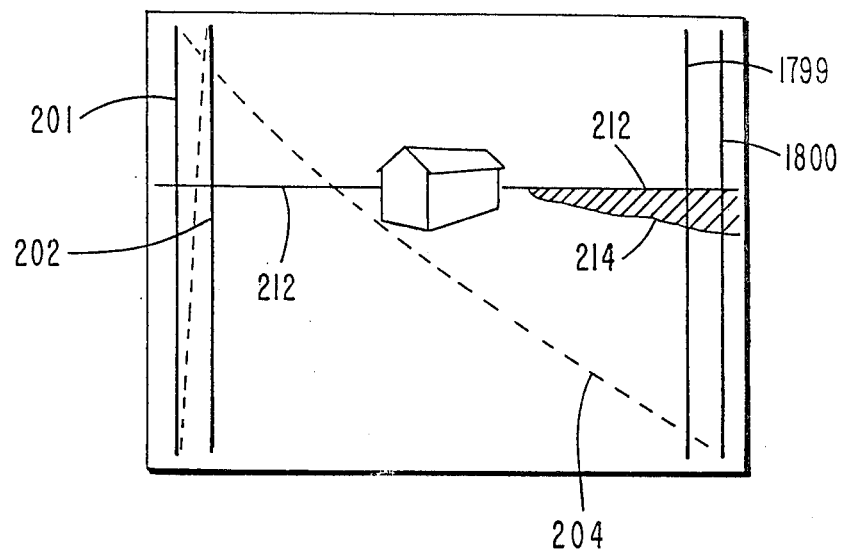
FIG. 2 illustrates vertical line-scanning of a scene to be televised and resulting video signals.

FIG. 2 aids in visualizing the scanning and transcoding scheme. FIG. 2a illustrates an image which may be formed on the faceplates of imagers 102–106 by the optical system 100, 108. The first vertical line-scan is illustrated by a vertical line 201 in FIG. 2a, and at the completion of the downwardly-directed vertical scan, there is an extremely rapid retrace to the top of line 202 and then a second vertical line scan. At the end of each vertical line scan, the scanner moves the beginning of the next following line scan slightly to the right, so that the vertical line scans progress from left to right across the image at the slower of the two scanning rates. In accordance with one embodiment of the invention, the horizontal progression is controlled at a rate such that 1800 active vertical line-scans occur during one left-to-right progression of the vertical line scans across the image. In another embodiment, the number of active vertical lines would be 2160. As will be described, these numbers are selected for ready transcoding of high-definition signals representing an image having aspect ratios of 5:3 and 2:1, respectively, to SDTV aspect ratios of 4:3. After the termination of the last vertical-line scan (1800) the scanner retraces along a path such as dotted line 204 to the beginning of line 201 in readiness for the beginning of the next following scan. As described, the scanning relates principally to a camera-tube imager. Solid-state imagers can be arranged to provide equivalent outputs, even though the signals are transferred out of the imager by shifting the entire contents into a register from which line-scans can be derived.

Figure 2B:
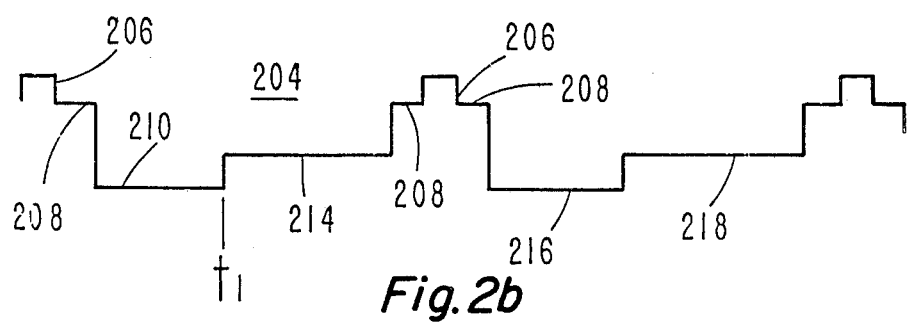
Figure 2C:
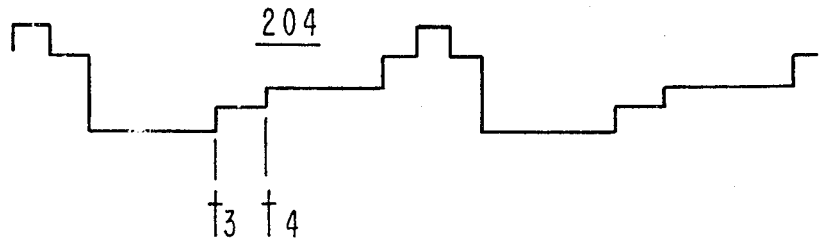

FIGS. 2b and c illustrate amplitude-time waveforms of the signals derived by vertical line-scan in FIG. 2a. In FIG. 2b, a video signal 204 includes recurrent synchronizing-signal portions 206 and blanking-signal portions 208, between which lies the active video portion. The top of line-scan 201 is represented by region 210 of video signal 204, and the transition in video signal 204 at time T2 represents the time at which vertical scan line 201 crosses transition line 212 in the image. Portion 214 of video signal 204 represents the image portion scanned by line 201 below transition line 212. Portions 216 and 218 of video signal 204 represents that portion of the image scanned by vertical scan line 202 above and below transition line 212, respectively. FIG. 2c illustrates the video produced by the last two vertical scan lines, 1799 and 1800. The transitions in the video at times T3 and T4 represent the change in the image during line scan 1799 at the times that the scan line crosses transition lines 212 and 214 of the image.

As illustrated in FIG. 2a, the embodiment of the invention scans 1800 active vertical lines per frame in a non-interlaced manner. Interlace is not necessary when the image in the form of a television signal (which will often be carried by a video tape recording) is converted into 35 mm or 70 mm film. For the purpose of viewing the signal on a monitor or receiver, it may be desirable to interlace. For the conversion from television signal to film, laser or electron beam scanning is used and the flicker rate is determined by the method of display of the resulting photographic film, and not by television interlace during exposure of the film. On the other hand, when transcoding must be performed to a SDTV system in which interlace is used, the memory otherwise necessary for performing the transcoding and as hereafter described can also be used to provide the interlaced trancoded signal.

Figures 3A, 3B:
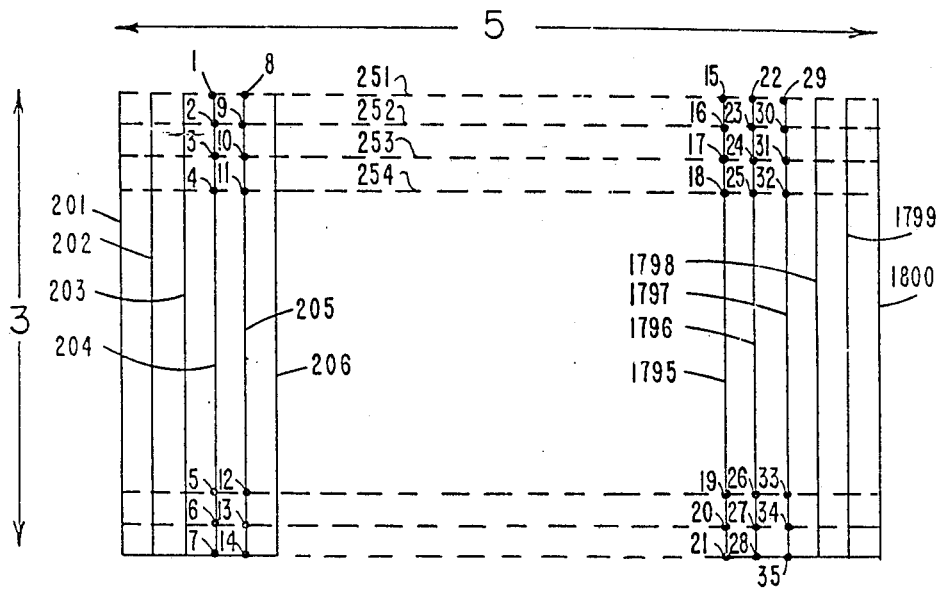
FIG. 3 illustrates scanning and sampling patterns on a raster and their relation to locations of a memory.

FIG. 3 illustrates a raster scanning pattern and a corresponding memory location pattern aiding in understanding of the invention. In FIG. 3a, a 5:3 aspect ratio pattern of vertical scan lines 201-1800 defines a raster. The raster is defined by the region scanned. As mentioned, according to one embodiment of the invention, 1800 line scans are represented, the scanning beginning with vertical line 201 and proceeding sequentially to 202, 203 . . . 1799, 1800. The reference numbering of the individual lines illustrated in FIG. 3 is not indicative of the total number of scan lines per frame being represented. These 1800 vertical scans take place over the interval of one frame. In the case of a solid-state sensor, the read-out occurs over the period of one frame.

When 35 mm film having a 5:3 aspect ratio is to be generated from the high-definition television signal, no cropping is necessary, and a laser or E-beam scanner is used to write the signal directly onto photosensitive film. When transcoding to a standard-definition television system, however, such as one having an aspect ratio of 4:3, some cropping of the picture is necessary. In FIG. 3a, the cropped region is represented by vertical scan lines 201, 202 and 203 at the left extreme and by scan lines 1798, 1799 and 1800 at the right extreme. Naturally, the actual number of incoming lines which will ultimately not be represented in the transcoded signal will be much greater than in the simplified example of FIG. 3. In the example shown, vertical line-scan 204 is the first one containing information which is to appear in the transcoded signal. Line-scan 204 begins at the top of the figure and proceeds downward. The dots labelled sequentially 1, 2 . . . 7 symbolically represent the points at which the signal generated during line-scan 204 should be sampled in order to produce samples representative of the value of a horizontal line-scan in the transcoded signal. For example, the value of the signal at point 1 on line-scan 204 is the same as the value at the beginning of the first active horizontal line-scan in the transcoded signal. Similarly, points 2, 3 and 4 represent the points at which the values of the video signal generated by line-scan 204 equal the value of the signal at the beginning of the second, third and fourth active horizontal line-scans 252-254. Similarly, towards the bottom end of line-scan 204, points 5, 6 and 7 represent points at which the value of the video signal represented by line scan 204 has the value of the left end of the last three horizontal line-scans 255-257 of the signal transcoded to. Thus, if the signal transcoded to is a 525-line NTSC signal, horizontal line-scans 251-257 represent the 485 active transcoded lines, whereas if a 625 line PAL signal is being transcoded to, horizontal line-scan 251-257 represent 575 lines.

Similarly, the second sample of horizontal line-scan 251 equals the value of the video of vertical line-scan 205 at point 8, and the second picture element of transcoded horizontal lines 252-257 are represented by points 9-14 on vertical line-scan 205. Each vertical line-scan thus sequentially defines a particular picture element of each horizontal line of the transcoded signal. The last element of horizontal line 251 is established by the value of line-scan 1797 at point 29, the last element of horizontal line 252 is established by the value of the video at point 30 on vertical line-scan 1797, etc.

It will be apparent to those skilled in the art that the horizontal resolution of the transcoded signal is determined by the number of vertical scan lines within the "sight" within the 5:3 high-definition raster which sight is defined by the aspect ratio of the transcoded signal. For example, vertical scan lines 201-203 and 1798-1800 are not within the sight of the raster of FIG. 3a for the transcoding illustrated. Lines 204-1797 are within the sight and the number of vertical scan lines determines the horizontal resolution of the transcoded signal.

It will be noted that interpolation of signal values is not necessary in order to produce pixel sample values for any predetermined number of horizontal lines in the signal transcoded to. Thus, no matter whether it is desired to transcode from the high-definition signal to a 525-or 625-line output signal, it is only necessary to select the value of the video of the vertical scan line at the time of the crossing of that point representative of a point on the horizontal line of the signal transcoded to. The avoidance of the requirement for a pixel interpolation between adjacent horizontal lines in order to produce the values of intermediate values of horizontal lines avoids a need for horizontal-line delays or memories operating at the high-definition data rate. High-quality interpolation between horizontal scan lines may require four or more horizontal-line delays, as described in U.S. Pat. application Ser. No. 262,619 filed 5-11-81 in the name of K. H. Powers. Where the incoming signal is a high-definition signal, the line delays must have sufficient capacity for the increased data rate. Consequently, the described vertical-scan arrangement is simpler and less expensive than arrangements in which the high-definition scans are parallel to rather than orthogonal to the scanning direction of the lower-definition system.

The information produced by vertical line scanning cannot be used instantaneously for the horizontally-scanned transcoded signal. For example, vertical line-scan 204 produces one pixel value for each of the horizontal lines of the output signal. Thus, it requires one vertical scan line of the high-definition system to produce a pixel value on each line of the output signal. It is not until point 29 has been scanned by vertical line-scan 1797 that all the points defining horizontal line-scan 251 are complete.

In order to provide vertical-to-horizontal line-scan conversion, a memory such as that illustrated as 300 in FIG. 3b may be used. The memory locations are designated by the number of the sample point of FIG. 3a which corresponds. At upper left of memory 300 is a memory location 1, into which may be inserted the signal value obtained by sampling vertical scan-line 204 at sampling point 1. Similarly, memory locations 2-7 represent memory locations into which may be inserted the signal values for sample points 2-7 along vertical scan-line 204. Similarly, memory locations 8-14 may be loaded with the pixel values from corresponding sample points on vertical scan line 205. Memory 300 contains a location for every pixel which is to be stored. If transcoding only to 525-lines-per-frame is expected, memory 300 need contain only 485 rows and as many columns as may be required by the desired horizontal resolution. On the other hand, if it is desired to be able to transcode to both 525- and 625-line systems, memory 300 must contain at least 575 rows, which means that some memory locations may not be used during transcoding to 525-line systems.

The memory locations of memory 300 are loaded in sequence, in the pattern shown, by signals sampled during a vertical scan. The vertical-to-horizontal transcoding is accomplished by reading in an orthogonal direction, that is to say by reading the first line beginning with memory location 1 and scanning 1, 8 . . . 22, 29, followed by a second horizontal line 2, 9 . . . 23, 30. Thus, each row is read out sequentially from top to bottom until the entire memory has been read. This simulates the rapid horizontal line-scan with a slow vertical scan common to the standard-definition television systems.

Figure 4:
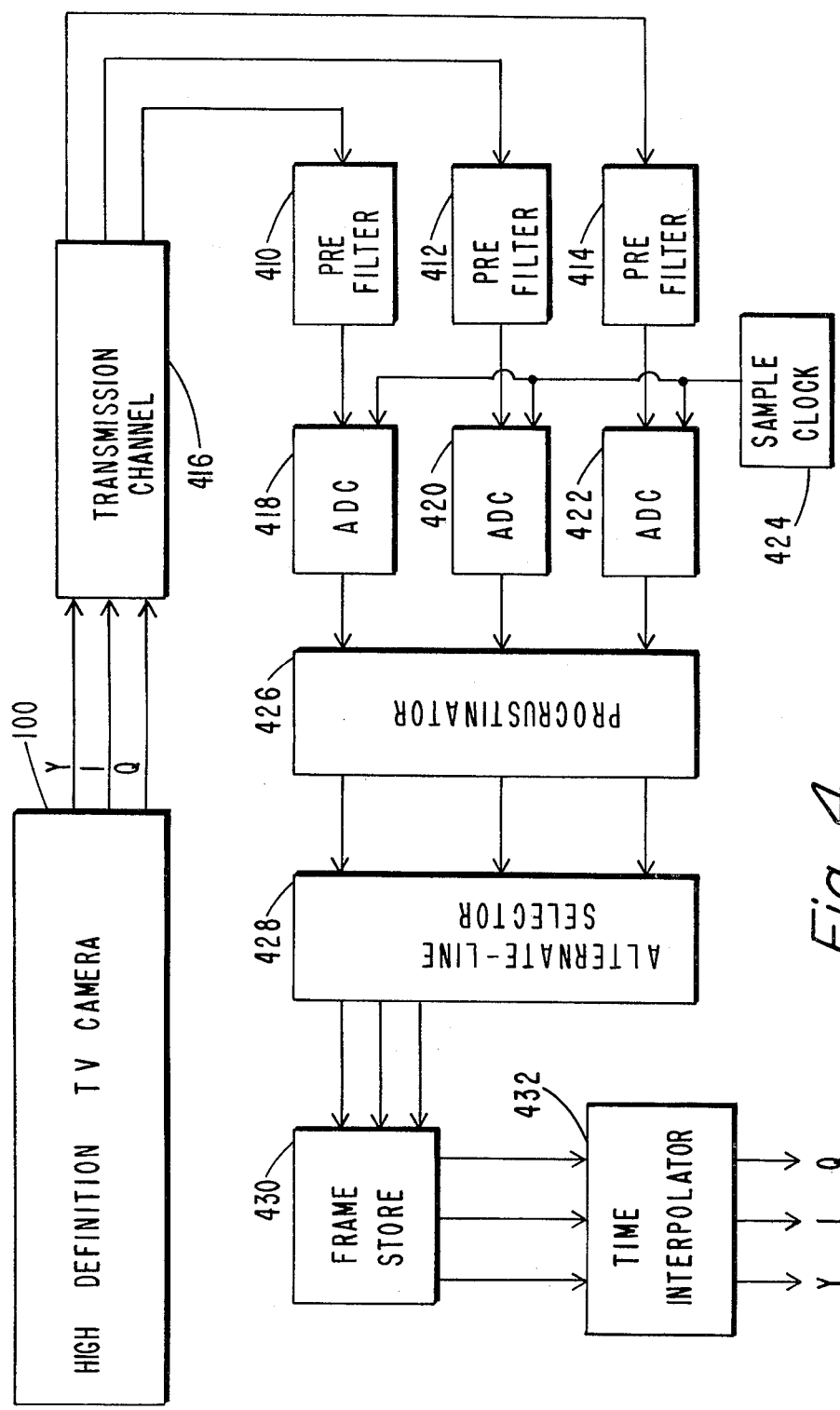
FIG. 4 is a block diagram of a television system according to the invention in which the analog-to-digital conversion sampling rate determines the transcoded horizontal line rate.

FIG. 4 illustrates a transcoder by which high-definition vertical-scan analog signals produced by the arrangement of FIG. 1 can be transcoded to other television systems. In FIG. 4, the high-definition Y, I and Q signals are applied to an analog transmission channel illustrated as a block 416 which may include a tape recorder or video disc channel portion. After processing by transmission channel 416, the Y, I and Q signals are applied to analog prefilters 410-414 for filtering to reduce aliasing resulting from the following analog-to-digital conversion in ADC blocks 418-422. The conversion rate is established by clock signals from a sample clock generator 424. The sample rate is selected in order to sample the filtered analog signal of each vertical line at a time at which the value of the vertical line-scan corresponds to the value of the sample of the horizontal line to be produced by transcoding. The digitized signals are applied to a procrustinator or aspect-ratio converter 426 which "lops off" or truncates those portions of the throughput signal representing the ends of the raster of the 5:3 aspect ratio signal to make it fit the 4:3 aspect ratio of the signal transcoded to. The truncated signals are applied to an alternate-line selector 428 which identifies alternate lines of the incoming signal for loading into memory, whereas the signals not selected are discarded. This alternate-line selection reduces the definition to the standard rate definition. The signals are then loaded into a frame store 430 which coacts with a time interpolator 432 for transcoding the field or frame rate to the desired frame rate of the output signal.

Frame store 430 may include a pair of memories, each capable of storing a frame of standard-definition information. One of the memories can be written into while the other is being read, in the fashion known as "ping-pong". The reading rate is determined by the output frame rate, and frames may be repeated or dropped occasionally in known fashion to accomplish frame-rate conversion, or time interpolation may be used as desired.

If the high-definition television signal is to be digital in form, it is necessary that the sample rate along the vertical line be high enough to provide the desired resolution when transferring the information onto the 35 mm film. Obviously, if the sample rate along the vertical line corresponds to 625-lines-per-frame, the resolution of the film exposed in response to the video information will have a vertical resolution no better than that of the standard 625-line television system. Obviously, the digital data rate for the digital high-definition television system must be established by other considerations.

The vertical dimension of the sampling grid defining the high-definition television system should be that number which lends itself to simple interpolation to both 485 and 575, the approximate numbers of active lines in the 525- and 625-line systems, respectively. It would be desirable to have a sampling rate in the vertical direction which would produce a sampling somewhat greater than that of the 485 active lines of the somewhat under-sampled 525-line system and that of the 575 active lines of the somewhat over-sampled 625-line system. A convenient number of active vertical elements is the number 1060, which is precisely the sum of 485 and 575. When the number of active vertical elements in the digital high-definition system is chosen to be 1060, transcoding or interpolation to the numbers 575 and 485 is simplified. Conversion between the 1060 active vertical elements of the vertical scan line is aided by breaking the HDTV elements of each vertical scanning line into 18 blocks each containing 59 HDTV elements. This interpolation ratio is $$1060/575 = 1.843472 \approx 59/32$$

This interpolation ratio can be closely approximated (within 0.02 percent) by a rational fraction (59/32) with a precise power of 2 in the denominator. This results in a reduction in the number of bits required in those multiplications needed when polynomial interpolation (quadratic or cubic interpolation) is performed by the methods described in the aforementioned Powers applications.

In a similar manner $$1059/484 = 2.1880165 \approx 35/16$$

where the interpolation ratio 1059/484 for transcoding from 1060 active elements in the HDTV vertical line-scan to 484 active elements of the 525-line standard can be approximated quite closely (within 0.02 percent) by a rational fraction (35/16) with a denominator which is a power of 2. In both of these approximations, one or two signal samples may be deleted, which produces a slight geometric distortion. No number other than 1060 within the range of 1000-1100 has the unique property of forming ratios of samples or elements which can be closely approximated by rational fraction with a power of 2 in the denominator. Taking into consideration the vertical blanking requirements of an analog standard comparable to the usual blanking practice, 1060 elements in the vertical scan would correspond to a horizontally scanned HDTV system of approximately 1150 total lines, which can be seen to again be equal to the sum of 525 and 625. However, in the case of a high-speed vertically-scanned HDTV system the blanking duration must be longer and each vertical scan will contain 1300 samples, more or less.

Figure 5:
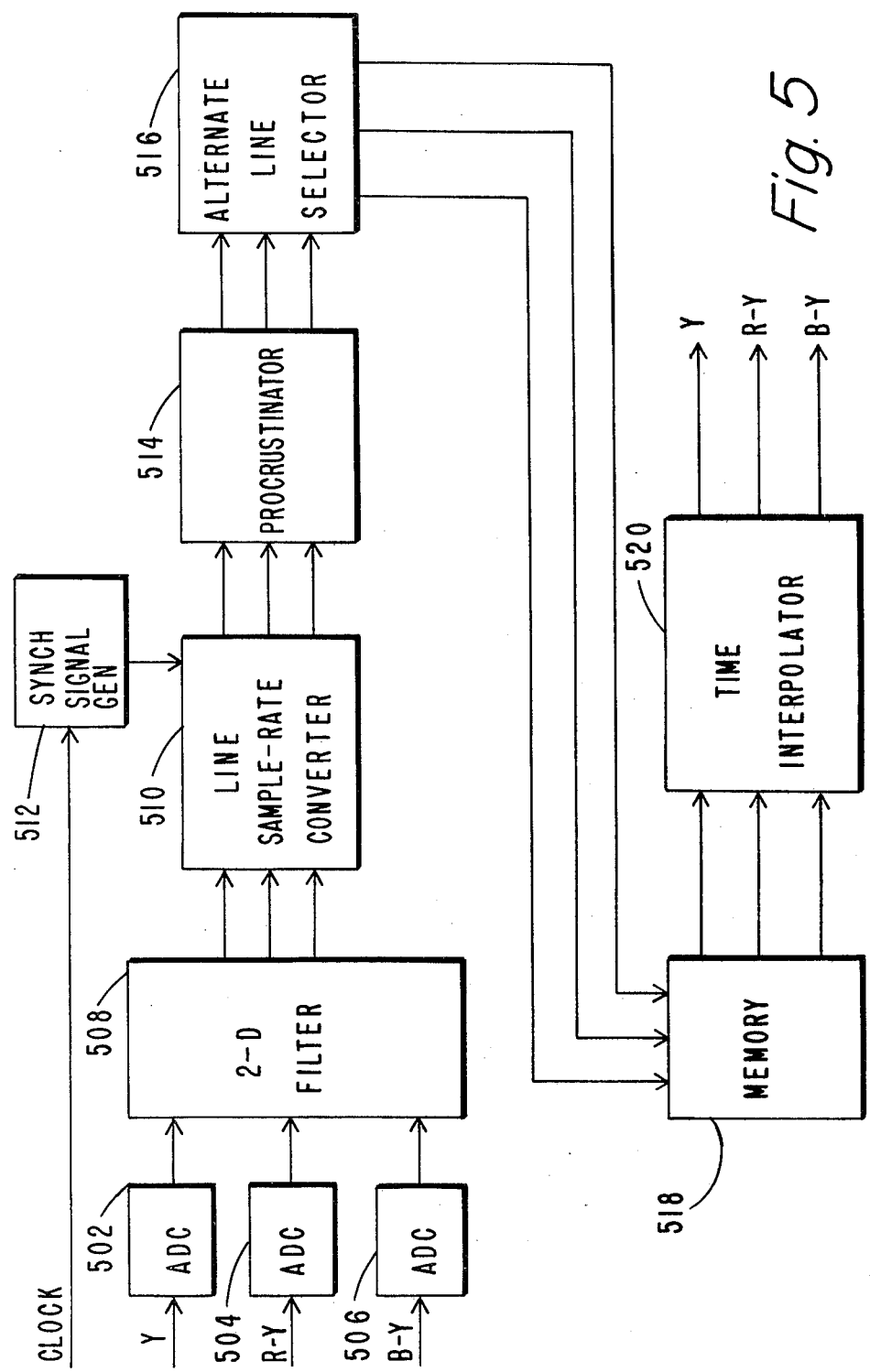
FIG. 5 is a block diagram of a digital television system according to the invention in which the horizontal lines of the output signal are generated by interpolation between the incoming high-definition digital samples.

FIG. 5 illustrates a transcoder by which the high-definition vertical-scan signals produced by the arrangement of FIG. 1 can be transcoded to other television systems. In FIG. 4, the high-definition Y, R-Y and B-Y signals are applied to analog-to-digital converters (ADC) 502-506, respectively. The analog input signals are sampled at a rate much higher than 4×SC, quantized and digitized to produce digital signals in either series or parallel formats. The signals may be at a rate for producing 1060 active elements, as described. The signals are applied to a two dimensional filter 508 which prefilters the video in the vertical and horizontal raster directions. The amount of filtering is dependent upon the number of lines in the signal transcoded to in order to avoid aliasing of the signal which may result from the reduction of sampling rate which occurs when the analog signal is line-sampled. The signal is then applied by way of a transmission channel (not shown) to a line-sample-rate converter 410 which converts the incoming digital sample rate to the outgoing line rate by interpolation to produce samples at points corresponding to the desired horizontal-line sample point. This sampling will ordinarily occur at points evenly spaced along each vertical scan. Synchronization of converter 510 is aided by a synchronizing signal generator 512 receiving clock signals from a source (not shown). The sampled signals are applied to a procrastinator or aspect-ratio converter 514 which "lops off" or truncates those portions of the throughput signal representing the ends of the raster of the 5:3 aspect ratio signal to make it fit the 4:3 aspect ratio of the signal transcoded to. The truncated signals are applied to an alternate line selector 516 which identifies alternate lines of the incoming vertical signal for loading into memory.

Alternate line selector 516 is an arrangement for eliminating every other vertical line-scan sample so as to limit the resolution of the signal transcoded from the high-definition system to the standard-resolution system. As mentioned previously, the standard digital system proposed by Powers is sampled at 13.5 MHz to achieve a common number of horizontal sampling elements in the active portion of both 525- and 625-line systems. As described in the Powers application, that common number of active samples is 704±16N, where N is an integer. The high-definition system for ease of transcoding should contain double that common number, modified by any change in aspect ratio. In the example given in which the aspect ratio of the high-definition system is 5:3 and that of the standard definition system is 4:3, the number V of vertical lines in the high-definition system is established by the equation $$2S \times 5/3 \times 3/4 = V$$

where S is the common number of active samples. For the case where N=1, the active number of samples in a standard definition television system is 720, and the corresponding number of vertical scan lines in the high-definition television system is 1800. This choice permits transcoding by simply selecting alternate signal samples for transcoding to both 525- and 625-line scanning standards.

The reduced data-rate signals from selector 516 are loaded into a memory 518 for storage until such time as complete horizontal lines of signal may become available and reading begins. Memory 518 coacts with a time interpolator 520 to make a time-dependent interpolation of the signal between the incoming frame rate and the outgoing field or frame rate. Generally speaking, the standard definition output frame rate will be either 25 or 30 frames-per-second. The frame rate for movie film is normally 24 frames-per-second, but the high-definition television system need not have a frame rate equal to the film display rate because transcoding of the high-definition television signal to film can be accomplished at other than real time, as the film is not viewed while being exposed. However, the existence of disparate frame rates for the standard-definition television signals makes it impossible to have a single frame rate for the high definition system which matches both standard-definition rates without time interpolation. Furthermore, the possibility exists that the high-definition television system may itself be viewed by means of direct satellite broadcast (DSB) or by direct projection in a theatre. Consequently, the frame rate of the high definition system must be high enough to avoid jerky motion.

Figure 6:
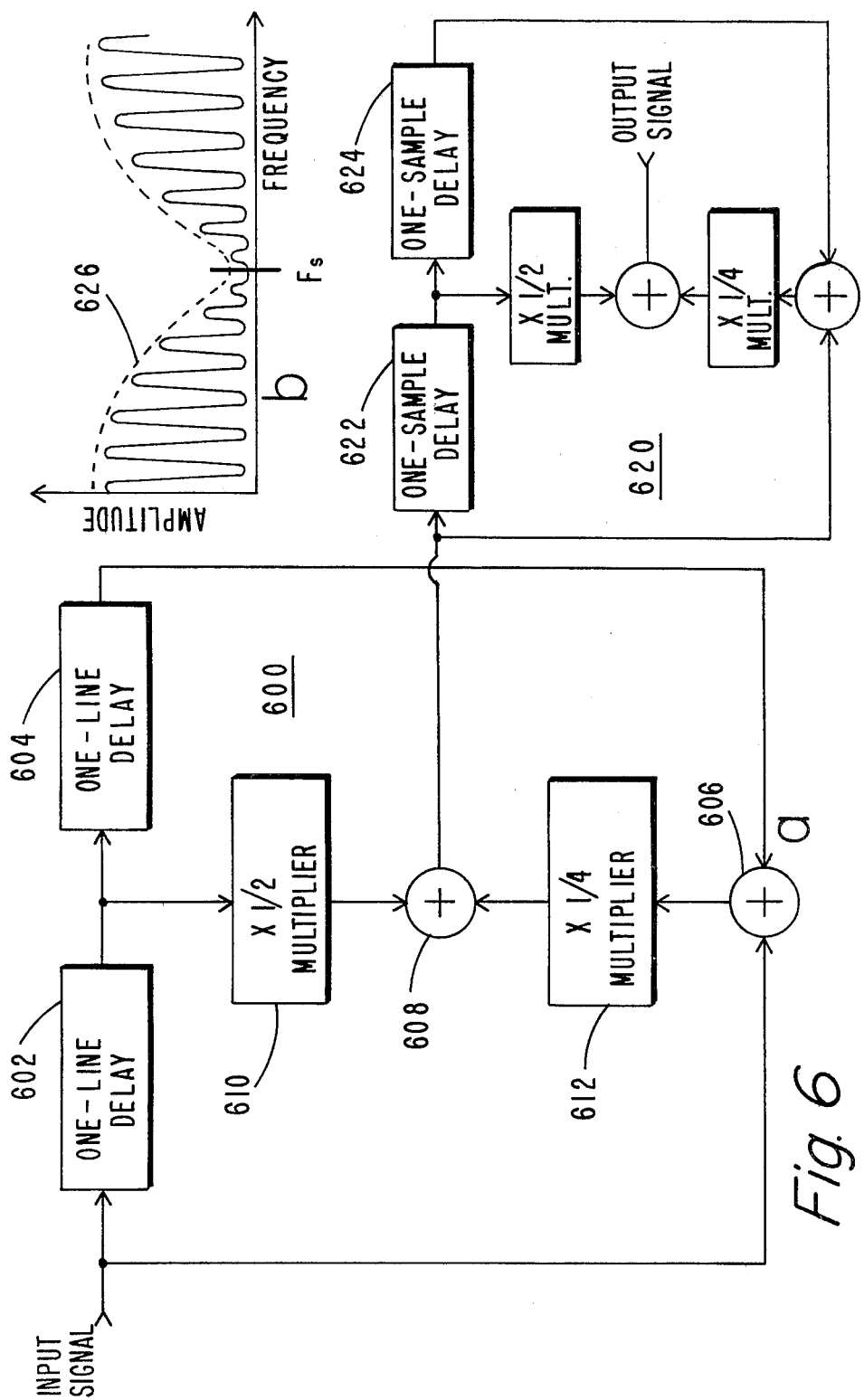
FIGS. 6a and b are block diagrams of a prefilter which may be used in the arrangements of FIGS. 4 or 5.

FIG. 6 illustrates in the form of a block diagram a two-dimensional filter such as filter 508 of FIG. 5 but which may also be an analog filter such as filter 414 of FIG. 4. In FIG. 6a, input signal is applied to cascaded one-line delays 602, 604 to produce three signals separated in time by one raster line. The input is also applied to a first input of a summing circuit 606. The output of delay line 604 is applied to a second input of summing circuit 606. The output of delay 602 is applied to a first input of summing circuit 608 by way of a multiplier 610 having a fixed multiplication ratio of ½ (which can also be viewed as a 6dB attenuator). The output of summing circuit 606 is applied to a second input of summing circuit 608 by way of a multiplier 612 having a fixed multiplication ratio of ¼. Elements 602–612 constitute a transversal filter having an amplitude-frequency response including peaks and valleys at multiples of half the line rate. This signal is applied to a similar transversal filter designated generally as 620 differing only in that the duration of the delay of delay lines 622 and 624 is the duration of one sample rather than one line. The response of this filter is a co-sinusoidal function having a null at frequency $f_s$, the response of the cascade of the two filters is illustrated in FIG. 6b in which the contribution of filter portion 620 is illustrated by the dotted line 626 which modifies the response due to filter 600. Such a filter reduces the amplitude of frequency components in both the vertical and horizontal directions and reduces aliasing. Other more complex filters providing superior performance may be desirable for particular applications.

Figure 7:
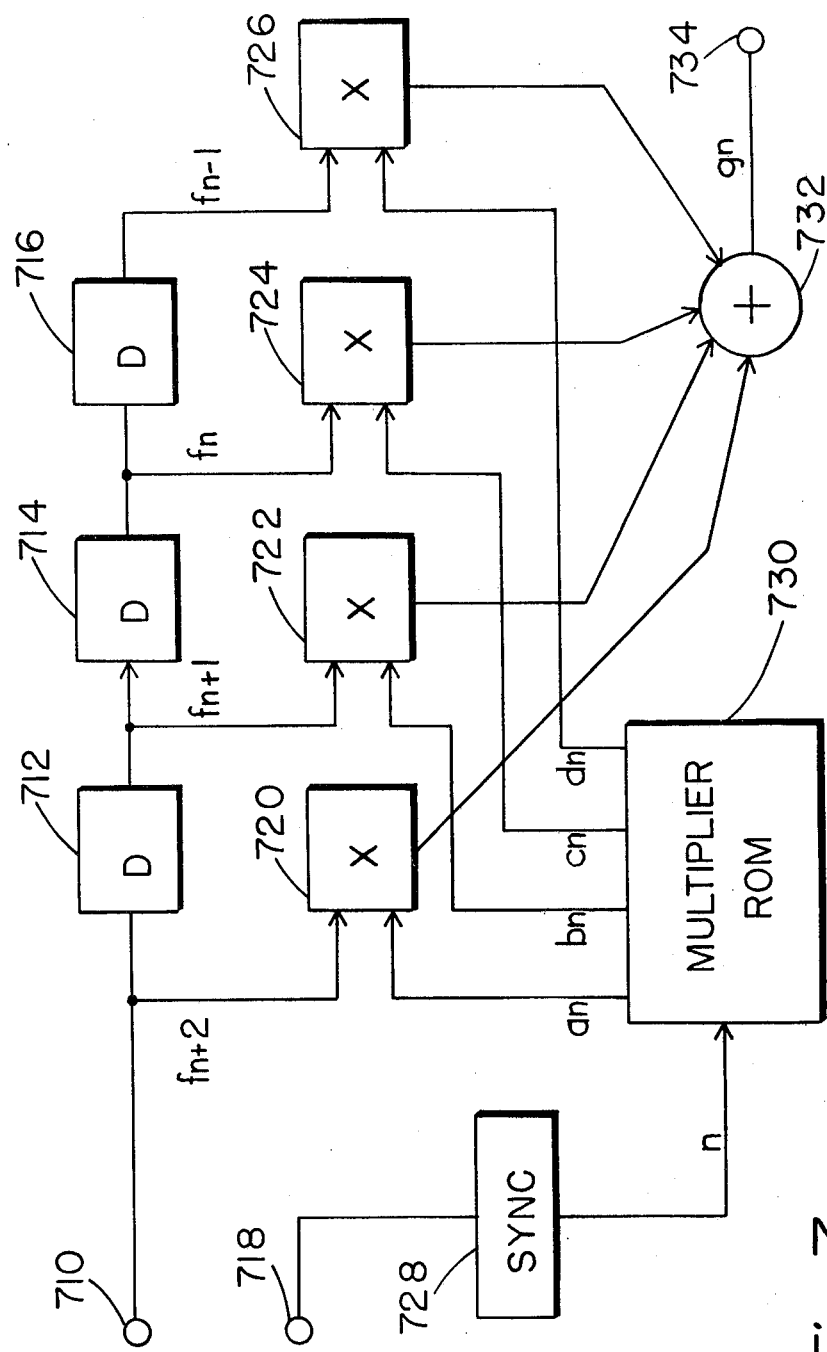
FIG. 7 is a block diagram of a line sample-rate converter which may be used in the arrangement of FIG. 5.

FIG. 7 illustrates in the form of a block diagram a line sample-rate converter such as converter 510, which is one embodiment of the interpolation system described in the aforementioned Powers application Ser. No. 262,619. The parabolic interpolation algorithms of that Application generally implement an equation of the form:

$$g_n = a_n f_{n-1} + b_n f_n + c_n f_{n+1} + d_n f_{n+2} \qquad (1)$$

where $g_n$ is an interpolated sample lying between the samples $f_n$ and $f_{n+1}$, and n is a running variable that indicates the numbered position of the sample $g_n$ in an interpolation block of M incoming samples $f_n$. For each value of n, the sample $g_n$ occurs at a position n' within the interval between $f_n$ and $f_{n+1}$ where n' is given for each n by $n' = (M-2^r)n$ (modulo $2^r$) and $2^r$ is the power of 2 in the denominator of the approximated interpolation ratio. Under the conditions where the interpolation ratio can be so approximated, the coefficients $a_n$, $b_n$, $c_n$, $d_n$ can be expressed as sums of fractions of the form $p/2^r$, where p is an integer less than or equal to $2^r$. Thus the multipliers required to implement equation (1) are of the simple shift and add type. In FIG. 7, an incoming digital video signal from one of the component outputs of filter 508 is applied to the input terminal 710 and thence to three consecutive delays 712–716 to produce simultaneously four successive samples $f_{n-1}$, $f_n$, $f_{n+1}$, $f_{n+2}$, which are used in pairs as inputs to the four multipliers, 720–726. An input sample-rate clock signal is applied at input terminal 718 and applied to a synchronizing circuit 728. The latter circuit contains a running-variable counter that determines the value n for each sample in the interpolation block of samples. The multiplier ROM 730 is a read-only memory that stores for each n the value of the sample position n' and the corresponding values of the four coefficients $a_n$, $b_n$, $c_n$ and $d_n$ that are applied simultaneously with the $f_n$'s as the second input to the multipliers 720-726. The output of the multipliers are applied to an accumulation or summing circuit 732 to produce the interpolated sample $g_n$ at output terminal 734. The values of $n'$ and the coefficients $a_n$-$d_n$ are of course, different when transcoding to 525-line or 625-line systems. However, by parallel processing, the transcoding to both output media can be performed at the same time.

Figure 8:
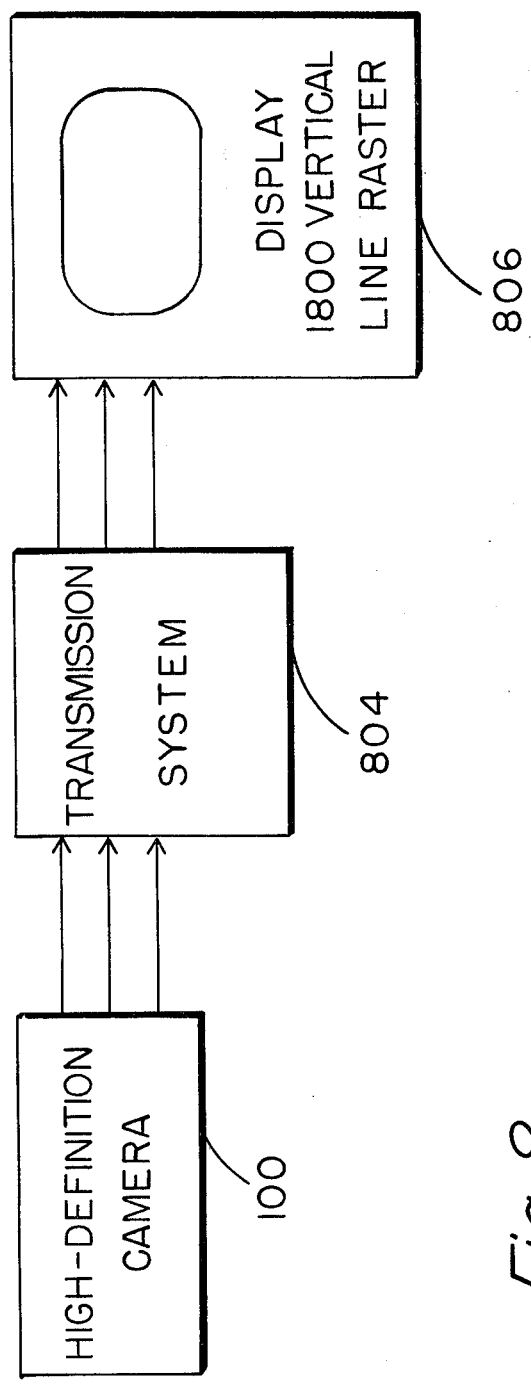
FIG. 8 is a block diagram of a system for direct display of signals on a high-definition monitor or receiver.

FIG. 8 illustrates a system including a high-definition camera 100 producing luminance and color-difference signals (or RGB signals) resulting from 1800 active vertical line-scans. The signals are sent through a transmission system 804 which may include a cable or broadcast system, and which may further include portions in which the signal is in composite form. The signals are finally applied to a television display unit 806 which is adapted for producing a picture from the signals. The picture is formed in known manner on a raster. In accordance with the invention, the display unit is adapted for direct display of the signals rather than for transcoded display. To this end, the raster is vertically scanned with 1800 active lines in the raster. This is a direct use of signals principally adapted for transcoding to other forms.

Other embodiments of the invention will be apparent to those skilled in the art. In particular, the vertical scanning may be right-to-left across the image rather than left-to-right as described in conjunction with FIG. 2. Similarly, scanning may be from the top down or from the bottom upward. The circuits and signal may be either analog or digital, the form of the signal being irrelevant to the invention. The procrustinator may precede the line sample-rate converter illustrated in FIG. 5, so as to limit the number of samples reaching the converter.

The transmission path associated with the combined arrangements of FIGS. 1 and 4 may be at locations other than the break between the FIGURES. For example, the transmission path may include a 3-track digital tape recorder coupled between ADC 402-406 and filter 408, whereby the tape is loaded with digitized information from the converters and the playback information is coupled to the filter. Alternatively, if the nature of the ultimate use is known, the digital tape recorder may be located between filter 408 and sample-rate converter 410.

A major advantage of the described vertical-scan system compared with a horizontally-scanned arrangement is that the line-rate transcoding may be accomplished without the use of a memory operating at the high-definition data rate. Since frame-rate or temporal conversion is necessary in any case, the frame-conversion memory operating at the standard-definition rate is used. This memory is ¼ the size which would be required for storage at the high-definition rate. This advantage is coupled with the further advantage of elimination of the line-conversion interpolators, and further provides the benefit of elimination of multiple-transcoding beats.

What is claimed is:

1. A mastering television video system adaptable for transcoding to systems having different numbers of horizontal lines per frame, comprising:

a controllable transducer for converting an image into a video signal by successive scans of the image;

scan control means coupled to said transducer for causing said transducer to scan said image in a vertical direction;

conversion means for converting from vertical to horizontal scan having a preselected number of horizontal lines per frame; and coupling means for coupling said scan control means with said conversion means, said coupling means comprising prefiltering means for reducing aliasing resulting from the vertical-direction sampling represented by said conversion from vertical to horizontal scan.

2. A high definition television system adapted for easy transcoding to 525 lines-per-frame, 60 frames-per-second digital systems and to 625 lines-per-frame, 50 frames-per-second digital systems, comprising:

video signal generation means for producing vertical line-scan video signals representative of the image to be televised;

scan control means coupled to said video signal generation means for creating a relatively high-speed vertical scan together with a relatively low-speed horizontal scan; and timing control means coupled to said scan control means for controlling the rate of said vertical scan so as to produce a number of vertical line-scans during each frame for defining the horizontal resolution of the system, said horizontal resolution being established as twice the product of an integer and a ratio, wherein said integer is the number of samples per horizontal line in the system transcoded to, and said ratio is the quotient of the aspect ratio of the high definition television system divided by the aspect ratio of the system transcoded to.

3. A high definition television system adapted for transcoding with reduced beat generation to television systems scanned horizontally at a high rate and vertically at a low rate, comprising:

controllable signal generation means for generating video signals from the image to be viewed, said signal generation means including deflection means for vertical scanning at a first rate and horizontal scanning at a second rate less than said first;

synchronizing signal generating means coupled to said controllable signal generation means for controlling said vertical scanning rate;

vertical prefiltering means for limiting the bandwidth of said video signals for reduction of aliasing; and line sampling means for sampling said bandwidth-limited video signals during each interval representative of a vertical line-scan to produce output signal samples representative of the values of the signal transcoded to.

4. A transcoder adapted for transcoding vertical-scan high-definition television signals to horizontal-scan standard-definition television signals, comprising: sample-rate conversion means coupled to receive said vertical-scan high-definition television signals for sampling said signals at points during each vertical scan corresponding to the sample points for the horizontal scan of the standard transcoded to, and for selecting alternate vertical lines for reducing the horizontal resolution of the transcoded signal; and coupling means for coupling said sample-rate conversion means to utilization means for coupling horizontal-scan information to said utilization means.

5. A transcoder according to claim 4 wherein said coupling means further comprises storage means.

6. A transcoder according to claim 5 wherein said sample-rate conversion means selects alternate vertical lines for reducing the horizontal resolution of the transcoded signal.

7. A transcoder according to claim 4 further comprising antialias filter means for reducing aliasing due to the sample-rate conversion.

8. A transcoder according to claim 5 further comprising a two-dimensional filter coupled for reducing aliasing.

9. A transcoder according to claim 1 further comprising a procrustinator coupled to said sample-rate converter for aspect ratio control.

10. A transcoder according to claim 1 or 9 further comprising time-interpolation means for frame rate conversion between the frame rate of said HDTV signals and said SDTV signals.

11. A high-definition television signal generator for generating signals adaptable for ready conversion to standard-definition television, comprising:
    an imager for generating signals representative of a scene being televised;
    scanning means for generating vertical line-scans of said scene;
    synchronizing signal generating means coupled to said scanning means for generating a number of said line scans per frame established by the product of an integer, first and second quotients and a second integer, where said first quotient is the horizontal-to-vertical aspect ratio of the raster scanned by said imager; said second quotient is the vertical-to-horizontal aspect ratio of the standard-definition television system to which ready conversion is desired, said first integer is two and said second integer is the number of samples per active horizontal line in the standard-definition television.

12. A high-definition television system, comprising:
    means for generating substantially 1060 active samples per vertical scan; and
    means for producing 1800 active vertical scans per frame.

13. A system pursuant to claim 12 wherein said 1800 lines are interlaced.

14. A system pursuant to claim 12 wherein said active samples are in digital form.

15. A high definition television system adapted for easy transcoding to 525 lines-per-frame, 60 frames-per-second digital systems and to 625 lines-per-frame, 50 frames-per-second digital systems, comprising:
    video signal generation means for producing line-scan video signals representative of the image to be televised;
    scan control means coupled to said video signal generation means for creating a relatively high-speed horizontal scan together with a relatively low-speed vertical scan; and
    timing control means coupled to said scan control means for controlling the rate of said vertical scan so as to produce substantially 1060 active horizontal line-scans during each frame.

* * * * *